United States Patent [19]

Kolleth

[11] 4,161,458
[45] Jul. 17, 1979

[54] STABLE AQUEOUS AEROSOL SYSTEM WITH CARBON DIOXIDE PROPELLANT

[75] Inventor: Gary G. Kolleth, Lakewood, Colo.

[73] Assignee: Scott's Liquid Gold Incorporated, Denver, Colo.

[21] Appl. No.: 828,974

[22] Filed: Aug. 29, 1977

[51] Int. Cl.$^2$ ............................................. C09K 3/30
[52] U.S. Cl. ................................... 252/305; 252/90; 424/44
[58] Field of Search ................................. 252/305, 90

[56] References Cited

U.S. PATENT DOCUMENTS

| | | | |
|---|---|---|---|
| 2,321,023 | 6/1943 | Goodhue et al. | 252/305 X |
| 2,358,986 | 9/1944 | McGovran et al. | 252/305 X |
| 2,563,621 | 8/1951 | Ritchie | 252/305 |
| 2,849,323 | 8/1958 | Young | 252/305 X |
| 2,930,384 | 3/1960 | Strain et al. | 132/7 |
| 2,948,595 | 8/1960 | Orr | 44/52 |
| 2,964,165 | 12/1960 | Riley | 252/305 X |
| 2,980,582 | 4/1961 | Keats | 252/305 |
| 2,998,391 | 8/1961 | Jones et al. | 252/305 |
| 3,031,408 | 4/1962 | Perlman et al. | 252/305 X |
| 3,096,290 | 7/1963 | Duane et al. | 252/70 |
| 3,144,385 | 8/1964 | McGrew | 252/305 |
| 3,145,113 | 8/1964 | Mordaunt | 252/305 X |
| 3,232,493 | 2/1966 | Beard, Jr. | 222/193 |
| 3,286,932 | 11/1966 | Kibler | 239/284 |
| 3,341,418 | 9/1967 | Moses et al. | 252/305 X |
| 3,361,544 | 1/1968 | Kaiser, Jr. | 44/52 |
| 3,387,425 | 6/1968 | Flanner | 252/305 X |
| 3,480,185 | 11/1969 | Steinberg et al. | 222/192 |
| 3,705,855 | 12/1972 | Marschner | 252/90 |
| 3,996,153 | 12/1976 | Heeb et al. | 252/305 |
| 4,017,602 | 4/1977 | Cazorla et al. | 252/305 X |

OTHER PUBLICATIONS

Krebs: "The Use of '$CO_2$ Buffers' in Manometric Measurements of Cell Metabolism", Biochemical Journal, 48, pp. 349–359, (1951).

Hsu et al.: "Calculations for Formulations with Soluble Gas Propellants", Aerosol Age, Dec. 19, 1964, pp. 34, 41, 43, 46 and 139.

"Soluble Compressed Gases", Aerosol Age, 1975, pp. 14–19.

Hayes: "$CO_2$ Old Standby Sparks New Interest", Reprint from Aerosol Age, 1975, (2 pages).

Primary Examiner—Richard D. Lovering
Attorney, Agent, or Firm—Watson, Leavenworth, Kelton & Taggart

[57] ABSTRACT

A stable water-containing aerosol system having carbon dioxide as the propellant and containing an amine which reversibly reacts with carbon dioxide or the reaction product of water and carbon dioxide which amine is added in an amount sufficient to adjust the pH of the system to the near neutral to slightly alkaline range is disclosed. Another solvent in which carbon dioxide is soluble, such as odorless mineral spirits, may be added to the system to serve as a reservoir for carbon dioxide gas necessary to maintain the pressure in the aerosol system as it is exhausted. The aerosol system is relatively noncorrosive in conventional aerosol containers.

3 Claims, No Drawings

STABLE AQUEOUS AEROSOL SYSTEM WITH CARBON DIOXIDE PROPELLANT

BACKGROUND OF THE INVENTION

In view of the recent controversy over the adverse effects of aerosol propellants containing fluorocarbons on the earth's ozone layer and the rising costs of such propellants, a need has arisen for replacements for fluorocarbon propellants. Various hydrocarbons have been suggested as substitute propellants, but in general these propellants are flammable and create a fire hazard.

Carbon dioxide has also been suggested as a propellant for various systems. In fact, carbon dioxide offers many advantages over hydrocarbon and fluorocarbon propellants. It is nontoxic, odorless, does not adversely affect the earth's atmosphere and is non-flammable. The pressure in a container using carbon dioxide gas is less affected by temperatures than fluorocarbons, hydrocarbons and other liquified gas propellants and is thus usable over a greater temperature range than other such propellants. Moreover, compressed carbon dioxide does not have the cooling effect caused by evaporation when liquified gases are used as propellants.

In addition to avoiding the problems encountered in the use of other propellants, the use of a carbon dioxide propellant has commercial advantages. For example, carbon dioxide is many times less expensive than fluorocarbon and hydrocarbon propellants and its cost would be negligible in most products. Thus, its use as a propellant would permit aerosol packaging of many low-priced products which previously have been unavailable in aerosol form due to the propellant costs. Further, smaller weight amounts of carbon dioxide are required for adequate pressure thus resulting in added cost reductions for the manufacturer and providing the user with a higher proportion of product per unit weight of a container's contents. In addition, in view of the relatively high solubility of carbon dioxide in many solvents, less of the container volume must be carbon dioxide for full expulsion of a container's contents.

Despite the above advantages, however, carbon dioxide has not proven satisfactory as a propellant in water-containing aerosol systems due at least in part to the formation of carbonic acid and resultant reduction in the pH of the system. The acidity of water-carbon dioxide aerosol systems have a corrosive effect on many aerosol containers, and may additionally have a deleterious effect on the active ingredients dissolved or dispersed in the aqueous system or impair their storage stability. In addition, the effective amount of carbon dioxide available as a propellant is reduced by the formation of carbonic acid. Also in aerosol systems containing alkaline ingredients, the carbonic acid formed by the water and carbon dioxide reacts to alter or reduce the effective amount of product available for use by the consumer and/or increases the manufacturers' production costs.

Although there have been suggestions for overcoming the problems of using carbon dioxide as a propellant in waterbased aerosol systems, including addition of surfactants, no entirely successful remedy has been forthcoming. Thus, despite its advantages, the use of carbon dioxide as a propellant in water-based aerosol systems have not been possible.

It is, therefore, an object of the present invention to provide a satisfactory water-containing aerosol system employing carbon dioxide as a propellant.

It is another object of the present invention to provide a water-containing aerosol system employing carbon dioxide as a propellant which system does not have a corrosive effect on conventional aerosol containers and thus is storage-stable.

It is a further object of this invention to provide a water-based aerosol system in which carbon dioxide propellant is present in sufficient quantity to expel the entire contents of an aerosol container.

It is yet another object of the invention to provide a water-based aerosol system having a carbon dioxide propellant which does not affect the active components of the product.

It is an additional object of the instant invention to provide a propellant composition for water-containing aerosol systems which avoids the problems and hazards of systems employing hydrocarbon and fluorocarbon propellants.

SUMMARY OF THE INVENTION

This invention relates to a stable aqueous system in a pressurized aerosol container employing carbon dioxide as the propellant. This system comprises a liquid phase and a gaseous phase. The gaseous phase comprises a compressed gaseous carbon dioxide propellant. The liquid phase includes water saturated with carbon dioxide to which an amine which reversibly reacts with carbon dioxide is added in an amount sufficient to bring the pH of the system to about 7. Substantially all of the liquid contents are dispensed from containers in which up to 90% of the volume of the container is initially occupied by the liquid phase.

A solvent in which carbon dioxide is soluble may be added to the liquid phase of the system. This solvent will serve as a reservoir for carbon dioxide and as the contents of the aerosol container are depleted will be a source of additional gaseous carbon dioxide.

DETAILED DESCRIPTION OF THE INVENTION

This invention relates to compositions for use in pressurized, valved, hermetically sealed containers. More particularly, the invention herein disclosed relates to water-based aerosol systems in which carbon dioxide is employed as the propellant.

In accordance with the present invention, the adverse effects, which result from the formation of carbonic acid in aerosol systems containing water in which carbon dioxide is employed as a propellant, are overcome by adding to the system an effective amount of an amine which will reversibly react with carbon dioxide or carbonic acid. The aerosol system employed in the practice of the invention comprises a liquid phase and a gaseous phase. The gaseous phase comprises carbon dioxide gas; while the liquid phase which is water-based contains an appropriate reversibly reactive amine and is preferably saturated with carbon dioxide. The amine is added in an amount sufficient to provide a pH of or near neutral after charging with carbon dioxide and attainment of equilibrium. The amount of added amine can be varied to adjust the pH of a system as required by the material and/or liner of the container and the active ingredients of the system.

The amine which may be employed in the practice of the invention must reversibly react with carbon dioxide or carbonic acid and must be capable of maintaining the pH of the system in the neutral or slightly above neutral range both at the time the system is filled and during storage. Amines which exhibit these required characteristics include the mono-, di-, and tri-substituted lower alkyl and alkanol amines. Specifically, diethanolamine, triethanolamine and diethylamine have been found to be effective in the system of the invention.

The mechanism by which addition of the amine overcomes the above-noted problems of corrosion, lack of adequate pressure and reactivity with alkaline ingredients is believed to involve formation of stable, pressure-responsive chemical complexes in the aqueous system. Thus, as an aid to understanding the means by which the invention may operate, it is postulated that the following reversible reaction takes place upon addition of, for example, diethanolamine, to the aqueous aerosol system:

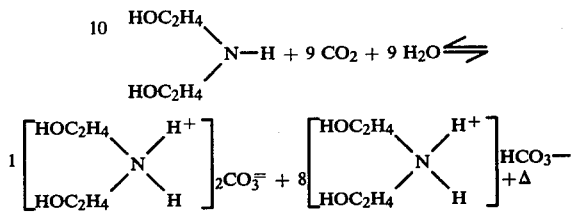

As a result of this reaction, the carbon dioxide in the aqueous phase is reversibly bound, and the adverse effects heretofore occasioned by the presence of carbonic acid, and/or an acidic pH, are materially lessened or eliminated. The pH of the aerosol system is stabilized and maintained in the essentially neutral or slightly alkaline range. The other amines which may be used in the aqueous aerosol system of the invention are believed to operate by the mechanism described above for diethanolamine.

The reaction mechanism postulated above is both reversible and pressure-dependent. Thus, as the aqueous system is expelled from the container during use, the resultant decrease in pressure promotes reversal of the indicated reaction with consequent liberation of a part of the complexed carbon dioxide. The carbon dioxide retained in the aqueous phase within the container remains complexed, however, thus avoiding undesirable acidity and related problems. As a result, the incorporation of the amine in the aerosol systems of this invention aids in overcoming the prior art problem of depletion of carbon dioxide available as propellant resulting from formation of carbonic acid. Thus, the pressure-dependent reversible complexing of the amines with water and carbon dioxide avoids the deleterious effects associated with the formation of carbonic acid in water-carbon dioxide systems, without, however, depleting the amount of carbon dioxide available to function as a propellant. Moreover, the corrosive effect of carbonic acid on the steel and tin-plating of conventional aerosol containers is minimized.

The aerosol system according to the present invention operates according to the general principles of systems employing compressed gas propellants. Thus, the volume of the container required as headspace for the gaseous phase is partially dependent on the degree to which the gas dissolves in the liquid phase. As compressed gas aerosol container is emptied, the pressure tends to decrease, both because some of the compressed gas is consumed in expelling the contents of the container and because the headspace volume increased as liquid volume decreases. If additional gas is not provided to replace that which has been expelled and to compensate for the increase in headspace volume, the internal pressure will decrease and impair operability of the system, further reaching a point where the aerosol is no longer operative.

The greater the solubility of the propellant gas in the liquid phase, the greater will be the amount of gas available to fill the headspace as the aerosol container is emptied, and there will also be a lesser decrease in internal pressure as the contents are expelled. Thus, a lesser portion of the volume of the container need be occupied by headspace to expel the entire contents where the propellant gas is relatively highly soluble in the liquid phase. Corresponding reduction of container size and container cost is thereby realized.

One measure of the solubility of a gas in a liquid is the Ostwald solubility coefficient, which indicates the volume of gas that can be dissolved in a given volume of liquid at specified temperatures and pressures (such as that at which the aerosol is packaged). The higher this coefficient, the greater the amount of gas that can be absorbed.

The Ostwald coefficient for water-carbon dioxide systems is relatively low. If, however, in addition to water the container includes a solvent for carbon dioxide which has a sufficiently high Ostwald coefficient, less headspace is required and the percent of fill can be increased. Such a solvent effectively operates as a reservoir for the carbon dioxide, and permits maintenance of a sufficiently high internal pressure to expel the entire contents of the container as well as providing a surplus to compensate for inadvertent discharge of the propellant (as by accidental discharge where the container is in an inverted position).

In the practice of this embodiment of the instant invention, it has been found that petroleum solvents are generally suitable, and odorless mineral spirits are particularly preferred as reservoirs for the carbon dioxide. Up to 75 percent weight of the liquid phase may constitute such solvents. Other solvents which may be suitable as carbon dioxide reservoirs are disclosed in U.S. Pat. No. 3,996,153 to Heeb, which patent's disclosures are incorporated herein by reference.

In practicing the invention, any of the conventional filling techniques may be employed to charge the compressed carbon dioxide gas into the headspace and cause it to dissolve in the liquid phase of the aerosol container. The particular method employed forms no part of this invention and various techniques may be used depending on the specific circumstances.

In general, however, it may be important first to evacuate or purge the can to remove air or other wholly or partially insoluble gases. One particularly effective method by which this can be accomplished is sweeping the aerosol container with carbon dioxide prior to installing and crimping the valve. If the rate of solution of the carbon dioxide in the solvent is too slow, various means such as agitation and refrigeration may be employed to increase the solution rate. It is desirable that the liquid be saturated with carbon dioxide to avoid further solution of carbon dioxide during storage with consequent reduction in the required internal pressure. Since the combination of amines, such as diethanolamine, triethanolamine and the like with water and carbon dioxide is exothermic, it is preferred to provide cooling means in order to maintain the system at a temperature sufficiently low to promote solution of the carbon dioxide in the liquid phase.

One method which may be used to charge an aerosol container with carbon dioxide gas is the gasser-shaker method, which involves shaking or agitating the container and its contents as the carbon dioxide is forced in through the valve, the liquid phase having been introduced prior to installation of the valve. The rate of injection of the gas depends on the valve orifice size, and the shaking time depends on the can size, the amount of liquid and the degree of agitation, as well as the temperature. To compensate for the exothermic nature of the operation, with resultant temperature rise and decrease in solubility, a filling pressure above that desired when the container is stabilized may be used, and/or cooling may be employed.

Another technique which may be employed to incorporate the carbon dioxide into the aerosol system is introduction into the liquid phase of small pieces of dry ice, followed by sealing of the container. Alternatively, the liquid may be saturated with carbon dioxide prior to introduction into the container, and then pumped under pressure to a rotary undercap filler and filled as in a normal undercap operation or pressured into containers already equipped with valves. Impact gassing, in which the carbon dioxide is injected into the system at high pressure, may also be used.

Combinations of any of these methods may also be used to charge the container with the desired amount of carbon dioxide. A particularly effective combination for making the aerosol system of the invention is saturation of the liquid phase with carbon dioxide while cooling, followed by impact gassing.

In order to fully evacuate the liquid phase of the aerosol system of the invention, it is generally necessary to charge the system to a minimum of about 35 psi. As a practical matter, much higher pressures of about 70–80 psi are required for proper aerosol misting of the entire liquid contents of the container. Since the reaction by charging the system of the invention is exothermic, the pressure of the system is initially somewhat elevated. To insure that the pressure of the system is adequate for the intended use, the system should be allowed to cool and reach equilibrium at ambient temperature prior to measuring the pressure charged into the system.

Depending upon the particular active components and intended use, various types of aerosol containers made of corrodible materials, such as steel and the like, may be used with the system of the invention. Tin-plated metal cans have been found to be suitable containers for the aerosol system of the invention. Protective coatings may be required in some cases to effect minimal corrosion.

The aerosol system of the invention may be used with almost any type of water-based or water-containing product, provided that the carbon dioxide is sufficiently soluble therein, does not react with the product constituents and will dispense the product in the desired form. Soaps, cosmetics, deodorants, shaving cream, lubricants, household cleaners, polishes and almost any other system which contains water and which is suitably dispensed as an aerosol are examples of the applications of the present invention. In some instances where very fine particles are desired, it may be necessary to use mechanical break up tips or valves equipped with vortex slots or grooves to achieve the desired effect.

In addition to the active ingredients of the liquid-based products used in the aerosol system of the invention, additives such as surfactants, emulsifying agents, thickeners and stabilizers may be employed as required by the specific products and their uses.

The following examples are illustrative of the invention and are not to be taken in a limiting sense.

EXAMPLE 1

5.7 g. of diethanolamine is added to a stainless steel cleaning and polishing composition comprising 43 g. water, 35.0 g. odorless mineral spirits, 0.5 g. alkanolamide, 15.0 g. low viscosity refined oil, 0.3 g. sodium benzoate and 0.5 g. of a blend of 80% nonionic and 20% anionic surfactant. The liquid is placed in a 7 oz. aerosol can and impact gassed with 7.0 g. of carbon dioxide gas. The pH of the system before gassing is about 11 whereas after gassing and equilibration it is about 7. 70% of the container is occupied by the liquid phase and 30% by headspace. The final pressure is 80 psig at room temperature. Substantially all of the liquid contents of the container can be expelled from the container without observable decrease in the cleaning or polishing effects of the expelled composition.

EXAMPLE 2

Aerosol containers prepared as in Example 1 are subjected to accelerated storage testing at 100° F. and 130° F. for one month. The results are as follows:

| Can Type | Results |
| --- | --- |
| 1. Style 35 - 0.50/25# double coat epoxy plus vinyl, high lead solder I/S stripe | 130° F. - Slight pinpoint detinning bottom end crevice area, otherwise negligible attack. Product normal. 100° F. - Negligible attack. Product normal. |
| 2. Style 64 - 0.25# single coat epoxy welded can no I/S stripe | 130° F. - Underfilm detinning side seam weld area, slight underfilm detinning bottom end crevice area. Product normal. 100° F. - Underfilm detinning side seam weld area, otherwise negligible attack. Product normal. |

As can be seen from the above results, the aerosol system of the instant invention exhibits substantially no corrosive effect during storage.

EXAMPLE 3

Aerosol containers are prepared as in Example 1, except that 0.25% sodium nitrite and 0.25% morpholine are added to the contents. The pH of the container and the final pressure are not affected thereby. The containers are subjected to accelerated storage testing as in Example 2, with the following results:

| Can Type | Results |
| --- | --- |
| Style 64 - 0.25# single coat epoxy welded can no I/S stripe | 130° F. - Underfilm detinning side seam, otherwise negligible attack. Product normal. |

As can be seen from the results, the addition of conventional corrosion inhibitors such as sodium nitrite and morpholine is unnecessary and does not significantly improve the storage stability of the system.

EXAMPLE 4

Three aqueous compositions are formulated by filling 90% of the volume of lacquer lined, tin-plated steel cans with the amine and water. Each can is charged to approximately 85 psi-g. and allowed to equilibrate at 28° C. The contents and pH of these compositions is as follows:

| | Relative Amounts | | | Total | |
|---|---|---|---|---|---|
| Composition | Amine | Water | $CO_2$ | Wgt. | pH |
| 1 | 8g diethanolamine | 40g | 3 | 260 | 7.4 |
| 2 | 8g triethanolamine | 40g | 1 | 258 | 7.0 |
| 3 | 1.5g $NH_4OH$ | 40g | 4 | 258 | 8.0 |

The contents are expelled and the grams of liquid, pressure and pH of each can is measured at various intervals. The results are as follows:

| Composition | grams | Pressure (psi-g) | pH |
|---|---|---|---|
| 1 | 39.5 | 35 | 7.4 |
| 2 | 40 | 35 | 7.0 |
| 3 | 40 | 25 | 6.8 |
| 1 | 20 | 30 | 7.4 |
| 2 | 12 | 35 | 7.0 |
| 3 | 20 | 20 | 6.8 |
| 1 | 4 | 30 | 7.4 |
| 2 | 3 | 33 | 7.0 |
| 3 | 5 | 20 | 6.8 |

As can be seen from these results, the diethanolamine and triethanolamine maintain a sufficient pressure level and pH throughout evacuation of the containers. On the other hand, pressure and pH of the ammonium hydroxide composition are relatively lower and it is thus less satisfactory for use in aqueous aerosol systems.

EXAMPLE 5

An aerosol container is filled to 90% of its volume with 252 g. of a composition containing 40 parts of water relative to 8 parts of diethanolamine. A second aerosol container is filled to 90% of its volume with water. Each container is charged with carbon dioxide. The pressure of the containers is adjusted to nearly equalize them by expelling gas. The containers are allowed to equilibrate at 28° C. Characteristics of the system at equilibrium and after evacuation of the contents are as follows:

| Composition | Initial Pressure | pH | Pressure after Evacuation |
|---|---|---|---|
| Water/Diethanolamine | 65 | 7.4 | 25 psi-g |
| Water only | 68 | 4.5 | 8 psi-g |

The above results indicate that the diethanolamine system has a pH which is in the noncorrosive range and that the pressure after full evacuation is adequate for proper aerosol misting of many liquid aerosol systems. The water system has an acidic pH and would be more corrosive than the diethanolamine system and the low pressure after evacuation indicates that less than all of the liquid contents are dispensed with satisfactory aerosol misting.

What is claimed is:

1. An aqueous aerosol system suitable for use in a pressurized aerosol container having a compressed gas propellant, comprising a gaseous carbon dioxide propellant phase and an aqueous liquid phase which liquid phase contains diethylamine, which undergoes a reversible reaction with carbon dioxide or carbonic acid, the amount of said diethylamine being sufficient to impart a neutral or nearly neutral pH to the liquid phase of the system at equilibrium after pressurization with the carbon dioxide.

2. The system according to claim 1, wherein the liquid phase further comprises an organic solvent having an Ostwald solubility coefficient for carbon dioxide which is greater than the Ostwald solubility coefficient of the aqueous liquid.

3. The system according to claim 2, wherein the organic solvent is odorless mineral spirits.

* * * * *

UNITED STATES PATENT OFFICE
CERTIFICATE OF CORRECTION

PATENT NO. : 4,161,458
DATED : July 17, 1979
INVENTOR(S) : Gary G. Kolleth

It is certified that error appears in the above-identified patent and that said Letters Patent are hereby corrected as shown below:

Column 1, line 19, "temperatures" should read --temperature--

Column 1, line 47, "have" should read --has--.

Column 3, line 66, "increased" should read --increases--.

Column 5, line 38, "reaction by" should read --reaction cause by--.

Column 6, line 60, "130°F. - Underfilm" should read --130°F. and 100°F. - Underfilm"

Signed and Sealed this

Twenty-seventh Day of November 1979

[SEAL]

Attest:

RUTH C. MASON
Attesting Officer

LUTRELLE F. PARKER
Acting Commissioner of Patents and Trademarks